Figure 1:
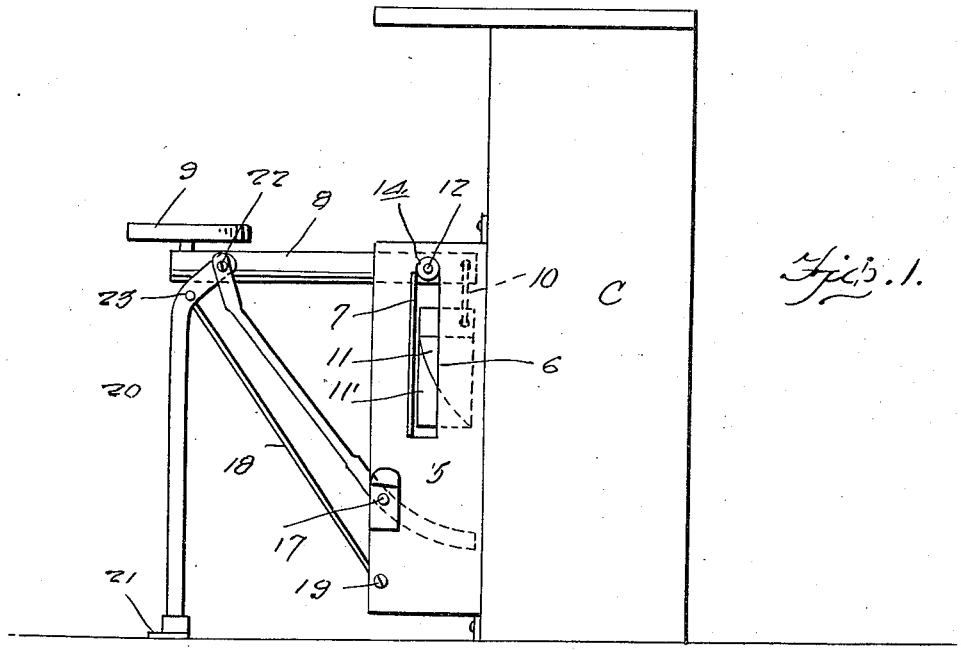

June 4, 1929.  L. C. SEVIER  1,716,327

LUNCH COUNTER SEAT

Filed April 4, 1928

Inventor
L. C. Sevier
By Clarence A. O'Brien
Attorney

Patented June 4, 1929.

1,716,327

UNITED STATES PATENT OFFICE.

LYMAN C. SEVIER, OF ASHEVILLE, NORTH CAROLINA.

LUNCH-COUNTER SEAT.

Application filed April 4, 1928. Serial No. 267,337.

The present invention relates to a seat for lunch counters and the like and has for its prime object to provide a structure which is easy to fold up to an out of the way position and when unfolded for use does not place any strain on the counter or the like.

Another very important object of the invention resides in the provision of a seat structure of this nature mounted on a counter balanced bar such as a supporting standard connected therewith and means for swingably mounting the standard and the bar so that the seat may be placed under the counter when not in use with the minimum effort.

A still further very important object of the invention resides in the provision of a seat of this nature which is exceedingly simple in its construction, inexpensive to manufacture and install, compact and convenient, and thoroughly efficient and reliable in use and operation.

With the above and numerous other objects in view as will appear as the description proceeds, the invention resides in certain novel features of construction, and in the combination and arrangement of parts as will be hereinafter more fully described and claimed.

Figure 2:
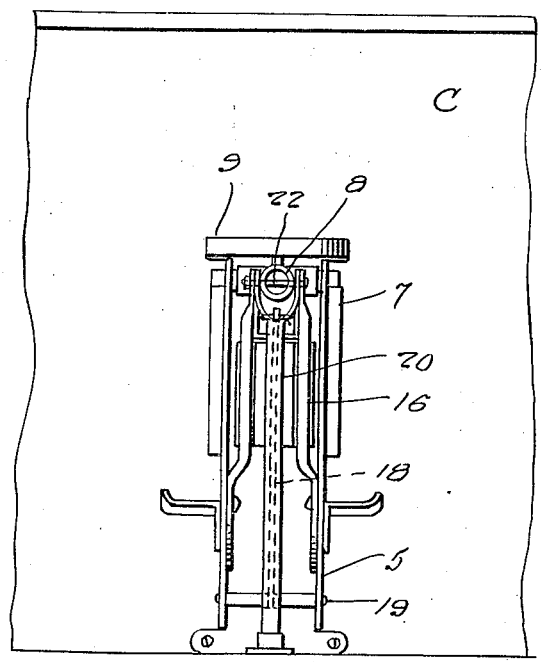
Figure 3:
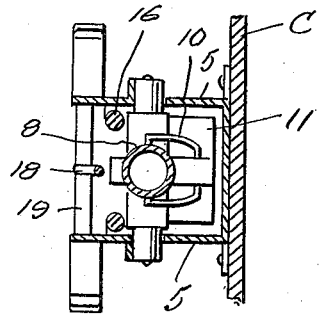

In the drawings:

Figure is a side elevation of the seat structure showing the same mounted on a counter and in an extended position, Figure 2 is a front elevation thereof showing the same extended, Figure 3 is a horizontal section through the seat structure folded.

Referring to the drawing in detail it will be seen that the letter C denotes a counter or the like which has attached thereto a pair of plates 5 extending perpendicularly thereto and is disposed in spaced parallel vertical position in respect to each other. These plates have their upper portions provided with vertical slots 6 which register with each other.

From the forward edges of the slots 6 there extend outwardly flanges 7. A bar 8 has a seat 9 fixed thereto at one end and adjacent the other end has a link 10 attached thereto from which is suspended a counter balance weight 11. Inwardly of and adjacent the link 10 there projects laterally from the bar 8 trunnions 12 on which are rotatable antifriction rollers 14 for movement in the slots 6. A pair of rods 16 are pivoted intermediate their ends as at 17 to the plates 5 adjacent the forward edges of their lower portions.

A rod 18 is pivoted as at 19 to the plates 5 adjacent the forward edges thereof and below the pivots 17. A supporting leg 20 is formed with a foot 21 at its lower end and has its upper end curved and bifurcated to straddle the bar 8 adjacent the seat 9. The furcations and rods 16 are pivoted to the bar as at 22. The rod 18 is pivoted to the furcations as at 23.

It will therefore be seen that when the parts are disposed as in Figure 1 the weight 11 counterbalances the weight of the bar 8 to the outer side of the pivots 22 so that the seat may be folded up against the counter at which time the bar 8 is disposed vertically and the trunnions 12 and their rollers 14 are at the bottom ends of the slots 6.

A pivot pin 19 extends between the plates and the lower ends of the rods 16 are adapted to lie alongside of the weight 11, when the structure is folded said weight being cutaway as indicated at 11' for this purpose and thus the weight is prevented from swinging forwardly away from the counter and the parts are held in compact folded position so that when it is desired to extend the seat it is necessary to use but little effort in pulling the seat outwardly, so that it will assume its proper position as shown in Figure 1.

It is thought that the construction, operation, utility and advantages of the invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A seat structure of the class described comprising a pair of spaced parallel vertical plates adapted to be attached to a counter or the like and provided with vertically disposed registering slots in the upper portions thereof, a seat bar having trunnions adjacent one end movable in the slots, a weight, means for suspending the weight from said one end of the bar, a seat at the other end of the bar, a pair of rods pivoted to the bar adjacent the seat and to the lower portions of the plate, a standard pivoted to the bar at the pivot of the rods therewith, a rod pivoted to the standard and to the lower portions of the plates below the pivot of the pair of rods therewith.

2. A seat structure of the class described comprising a pair of spaced parallel vertical plates adapted to be attached to a counter or the like and provided with vertically disposed registering slots in the upper portions thereof, a seat bar having trunnions adjacent one end movable in the slots, a weight, means for suspending the weight from said one end of the bar, a seat at the other end of the bar, a pair of rods pivoted to the bar adjacent the seat and to the lower portions of the plate, a standard pivoted to the bar at the pivot of the rods therewith, a rod pivoted to the standard and to the lower portions of the plates below the pivot of the pair of rods therewith, the upper end of the standard being bifurcated to straddle the bar.

3. A seat structure of the class described comprising a pair of spaced parallel vertical plates adapted to be attached to a counter or the like and provided with vertically disposed registering slots in the upper portions thereof, a seat bar having trunnions adjacent one end movable in the slots, a weight, means for suspending the weight from said one end of the bar, a seat at the other end of the bar, a pair of rods pivoted to the bar adjacent the seat and to the lower portions of the plate, a standard pivoted to the bar at the pivot of the rods therewith, a rod pivoted to the standard and to the lower portions of the plates below the pivot of the pair of rods therewith, the upper end of the standard being bifurcated to straddle the bar, rollers journaled on said trunnions and disposed in said slots.

4. A seat structure of the class described comprising a pair of spaced parallel vertical plates adapted to be attached to a counter or the like and provided with vertically disposed registering slots in the upper portions thereof, a seat bar having trunnions adjacent one end movable in the slots, a weight, means for suspending the weight from said one end of the bar, a seat at the other end of the bar, a pair of rods pivoted to the bar adjacent the seat and to the lower portions of the plate, a standard pivoted to the bar at the pivot of the rods therewith, a rod pivoted to the standard and to the lower portions of the plates below the pivot of the pair of rods therewith, the upper end of the standard being bifurcated to straddle the bar, rollers journaled on said trunnions and disposed in said slots, the pair of rods extending in between the plates from their pivots therewith and said weights being cutaway on the sides thereof so that a portion of the weight may fit between said rod extensions.

In testimony whereof I affix my signature.

LYMAN C. SEVIER.